Dec. 29, 1931.  G. H. CLAMER  1,838,527
ELECTRIC INDUCTION FURNACE
Filed Dec. 7, 1928
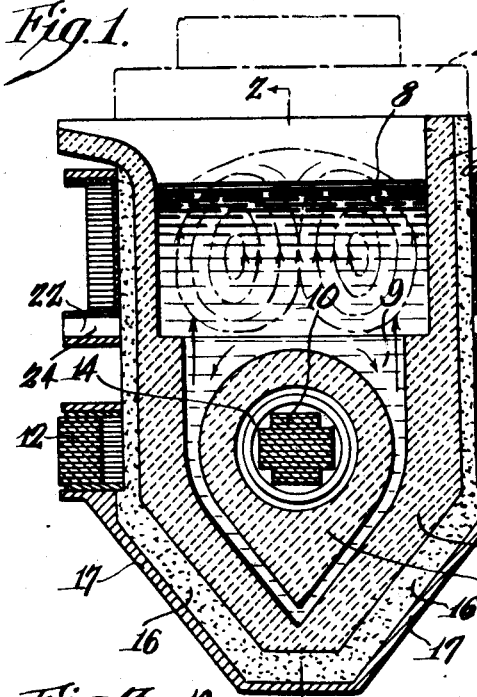
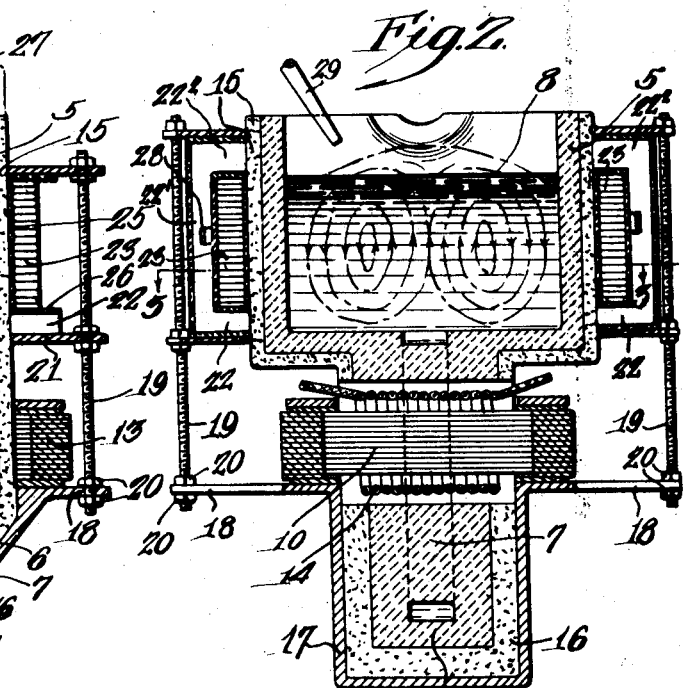
Inventor
Guilliam H. Clamer.
by Wm Steell Jackson
Attorney
Witness:
Walter Chum Patented Dec. 29, 1931

1,838,527

UNITED STATES PATENT OFFICE

GUILLIAM H. CLAMER, OF ATLANTIC CITY, NEW JERSEY, ASSIGNOR TO AJAX ELECTROTHERMIC CORPORATION, OF AJAX PARK, NEW JERSEY, A CORPORATION OF NEW JERSEY

ELECTRIC INDUCTION FURNACE

Application filed December 7, 1928. Serial No. 324,368.

My invention relates to electric furnaces which are intended to melt, treat or melt and treat metals.

The main purpose of my invention is to present new surfaces of hot molten metal at the top of the melt with maximum rapidity so that the metal may be refined to the best advantage either by a slag reaction or by reaction with gases, including air.

A further purpose of my invention is to combine melting and stirring functions in an electric furnace with the greatest economy of individual operation and maximum benefit of relative position of the heating and stirring means.

A further purpose is to provide a lower furnace having high efficiency in melting or in additionally heating a molten charge and which delivers its more highly heated metal to a communicating pool with a furnace having high speed and efficiency in vertical stirring within the pool so as to make possible maximum heating and stirring effects and maximum contact of the metal of the furnace with any treating substance such as an added alloying metal, an air or gas blast or a slag.

A further purpose is to provide a submerged resistor furnace discharging preferably upwardly into a pool with means for stirring the pool vertically to the best advantage, preferably by a pool-surrounding coil.

A further purpose is to combine a so-called core type of furnace with a so-called coreless type of furnace operating upon the same molten metal charge in such relation that each to best advantage adds that in which the other is weakest in the combined heating and treating of molten metal.

Further purposes will appear in the specification and in the claims.

I have preferred to illustrate my invention by one form only, selecting it not only because it is the best form known to me but because at the same time it well illustrates the principles of my invention.

Figures 1 and 2 are central vertical sections, largely diagrammatic, showing the same general preferred form of my invention and taken at right angles to each other. Figure 1 shows a slag-covered surface and Figure 2 shows a surface free from slag to which an air or gas blast may be applied. Figure 1 shows a partial magnetic path about the lower part of the pool and Figure 2 shows a much more complete magnetic return path.

Figures 2a, 2b and 2c are diagrammatic views of connections.

Figure 3 is a section of Figure 2 taken upon line 3—3.

Figure 4 is a side elevation of the furnace seen in Figure 1.

In the drawings similar numerals indicate like parts.

Describing in illustration and not in limitation and referring to the drawings:

In furnaces intended both for heating and mixing functions the submerged molten resistor furnace such as is shown in any of the Wyatt patents has proved to be a very efficient heater with mixing qualities quite sufficient in most instances for mixing the melt to secure homogeneity of the final product. For present purpose the best of these is that shown in United States patent to Wyatt, No. 1,201,671.

The mixing of these submerged loop resistor furnaces has been confined to the effect of the jets thrown up into the pool approximately in line with the outer edges of the submerged channel and has not been equally effective in other radial planes through the body of the pool. With deeper pools it has had a considerably reduced effect at the molten surface.

On the other hand where metal is to be treated by an air or gas blast directed upon the surface of the pool, or where the molten metal is to be treated by alloying metals or chemicals introduced within the pool body or carried upon the surface of the pool in a slag, for example, it has been quite desirable that the pool shall be subjected to a more vigorous and more generally distributed stirring action. However, unless the stirring takes place in vertical planes a large part of the mixing which is effected is wasted so far as taking up elements from a gas or air blast, or from a surface slag, is concerned.

I have discovered that an efficient melting furnace feeding super-heated molten metal to a connecting pool may be combined with means for vertically-stirring the molten metal of the pool to great advantage, utilizing the greater heating efficiency with relatively lower stirring capacity of the heating furnace along with the higher stirring capacity and lower heating efficiency of the second furnace to melt and mix respectively to a maximum advantage.

The most efficient stirring means operating within vertical planes within a furnace pool, of which I have knowledge, is found in the pool-surrounding or "coreless" form such as is exemplified in Northrup Patents Nos. 1,286,394 and 1,286,395, whose stirring effect within vertical planes is pointed out in these patents.

This furnace also both heats and stirs the metal. At higher frequencies the heating effect is the predominant effect and the stirring is less noticeable. This is because the heating varies with the frequency. As the stirring varies with the square of the ampere turns—true of heating also—but is independent of the frequency and the current must be increased with lower or normal frequencies to get the required power input, the stirring is predominant at lower frequencies.

The Northrup type furnace is therefore at normal frequency relatively more efficient in its stirring operation than in its heating operation when compared with the Wyatt types and, therefore, to great advantage, receives and stirs within its molten pool the metal superheated in the resistor type of furnace whatever the form and driven from it into the pool.

In the form of my invention shown I illustrate a Wyatt type of furnace having a Northrup type of coil placed about the pool serving for the Wyatt type of furnace. Without intending to restrict to the form shown I will describe the invention.

The refractory 5, 6, 7 forms walls for an upper pool 8 and a depending molten loop resistor 9. Through this loop resistor passes the central leg 10 of a transformer 11 having end legs 12 and 13 forming a laminated shell-type transformer. The central leg is energized by an alternating current coil 14 supplied from any suitable supply source so that the molten metal is heated and at the same time is driven up from the resistor channel into the pool according to the well known laws applying to molten-resistor furnaces. With the form illustrated the hot metal goes up the outside and is replaced by cooler metal from the pool which passes down inside of the path of hot metal.

The pool and resistor channel are heat insulated at 15, 16 and are covered at the bottom by a metal casing 17 shown as terminating in ears 18.

Through the ears 18 are passed retaining bolts 19 secured against vertical movement therein by nuts 20.

In suitable position for the support of the upper part of the furnace I provide a preferably non-magnetic circumferentially-interrupted horizontal supporting member 21 above which is located magnetic return 22 for the lower part of the field of force set up by a pool-surrounding coil 23. This magnetic return need not be circumferentially continuous and, in fact, should be interrupted and laminated to prevent flow of electric current. I find that the purpose is secured by vertically laminated field portions 24 distributed at intervals about the circumference. Above this field is supported the inductor coil electrically insulated at 25, 26 and 27. The furnace is surmounted by any suitable cap or cover structure.

The magnetic material 22 at the lower end of the inductor coil forms an effective aid in the return circuit of the magnetic lines of force generated by the pool-surrounded coil 23. I may supply a path of return for the flux from the inductor coil by forming the partial return paths 22 as vertical bars $22'$ terminating in poles $22^2$, preferably in that event bringing the iron of the circuit closer to the line of fluxpath along the inside of the coil at the bottom of the coil.

Where the magnetic circuit comprises spaced strips extending upward at intervals above the furnace it is much improved by making these strips electro-magnetic by surrounding them with one or more turns or coils 28 of wire carrying a current which may be in series with the inductor coil or induced thereby.

The inductor coil 23 and the coil 14 are supplied with alternating current from any suitable source shown in Figures 2a, 2b and 2c, and may be supplied by different sources as in Figure 2c, in that case usually to secure different frequencies, or from the same source. When from the same source, as in Figures 2a and 2b, they can be supplied in series to pass the same current through each if desired or in parallel and then permissibly, from different phases of the same source. For the purpose of the present invention it is immaterial whether the inductor coil be water cooled or air cooled, and this detail has not been shown. The character of cooling of the coil 14 is also not material.

In Figure 2 I show a nozzle 29 by which an air blast may be applied to the pool surface for oxidation purposes. Chemical reagents or alloying metals may be placed on the surface to become mixed into the metal or may be inserted with the air blast.

The question of whether the currents for the two coils be supplied from the same source of current or not depends in large measure upon the question of the desirability or lack of desirability of using currents of the same frequency for the two coils. Where a pool-surrounding coil is used for the purpose primarily of heating, the higher rate of speed of change of high frequency current makes it desirable in many installations to use high frequency current, but where, as in the present case, the stirring effect of the pool-surrounding coil is sought rather than the heating effect the currents can easily be brought down to a normal frequency such as is commonly used with the Wyatt type of furnace, permitting the two coils to be supplied from the same source, and, where this is chosen, leaving the question of whether they shall be supplied in series or in multiple, or from two phases of the same source to be determined by the desirability of designing the coils to carry the same current or to carry different currents and by the single phase or two phase character of the supply.

Though the Wyatt form of submerged channel electrical inductor furnace is the most efficient of the inductor heating furnaces, with which I am familiar, I recognize that the function of highly heating the molten metal within the pool directly or heating it outside the pool and delivering it in highly heated form into a molten metal pool can be performed by other means including other forms of electric furnaces and that, therefore, the part of the Wyatt submerged channel inductor heater played in this invention can be substituted by other means including, for example, other forms of submerged channel inductor furnaces.

The furnace finds its greatest utility in the low cost at which unusually thorough mixing and chemical treatment at the surface are attainable, of special value where alloying materials are added or when slagging or fluid blast are used to affect the character of the product.

The main heating operation with some stirring is performed by the lower furnace, and the main stirring operation with some heating is performed by the upper furnace so as to make use of the upper furnace not only as a pool and a mixing pool for the molten metal, but as a treating pool for the metal, within which, independently of the heating function, molten metal, at the heat desired, mixed with any ingredients to be added may be subject to the action of a treating slag or to the action of a blast of any character.

It will be seen that in the best form of my invention the submerged resistor discharges from the channel into the lower part of the furnace in jets, usually on opposite sides of the pool but without any general and uniformly distributed vertical stirring effect, while the pool-surrounding coil causes a rapid and general circulation up through the body of the metal and down outside of the upwardly flowing stream giving a maximum of circulation applied.

In the discussion of low frequency it is of course not intended that a special frequency must be employed lower than the normal or commercial frequency, nor that a frequency may not be used which is higher than the commercial frequency if that be convenient and otherwise desirable. The lower range of frequencies, however, is indicated and normal or commercial frequency will in fact ordinarily be used both because of its availability and because of its entire suitability for the purpose indicated.

In view of my invention and disclosure variations and modifications to meet individual whim or particular need will doubtless become evident to others skilled in the art, to obtain all or part of the benefits of my invention without copying the structure shown, and I, therefore, claim all such in so far as they fall within the reasonable spirit and scope of my invention.

Having thus described my invention, what I claim as new and desire to secure by Letters Patent is:—

1. The method of heating and stirring the charge in the pool of an electric furnace from the bottom to the top, which consists in heating at a distance from the pool a part of the molten metal continuously connected with the pool to receive molten metal from the pool, in delivering the same molten metal back to the pool after heating it and in stirring the molten metal electrically separate from the stirring given it by delivery from the part, and in generally vertical planes, to mix the different depths of the pool, one with another.

2. The method of stirring the molten metal within a furnace having a pool, which consists in heating at a distance from the pool a part of the molten metal continuously connected with the pool to receive molten metal from it, in delivering the molten metal after it has been heated back into the pool, near the bottom of the pool, in electrically circulating the molten metal of the pool up the interior and down outside of the upward stream to mix the heated part of the metal more thoroughly with the rest of the metal of the pool and to bring a new portion of the metal of the pool constantly up through the body of the pool to the surface of the pool.

3. The method of stirring a molten furnace pool, which consists in heating at a distance from the pool molten metal separate from the pool but continuously communicating from the pool to receive molten metal from it, in delivering the molten metal after heating back into the pool at the bottom, in electromagnetically circulating the molten metal of the pool from the outer part toward the central part and up the interior to mix the metal more thoroughly and to bring a new portion of the pool constantly up through the body of the pool to its surface so as to expose the changing surface for treatment and in treating the changing molten metal at the surface of the pool to affect its character.

4. The method of heating and stirring a molten metal pool having a molten resistor below the level of the pool, which consists in heating the molten metal in the resistor and circulating it into the pool by inducing flow of electric current lengthwise of the resistor and electromagnetically applying combined pinch and motor effect circulation to the pool by inducing flow of electric current circumferentially within the pool.

5. The method of heating and circulating molten metal within a furnace pool having a lesser part of the molten metal separated from the pool but communicating with it in the form of a submerged resistor, which consists in causing heating of the metal in the resistor and communication of this metal with the pool by passing a current of electricity lengthwise of the resistor and stirring the molten metal in the pool by circulating alternating electric current in horizontal directions about the pool and thus inducing current flow within the pool, using the same frequency of electric impulses for the heating and stirring.

6. The method of heating and stirring metal in an electric furnace to secure maximum efficiency, which consists in heating the metal by a core-type of electric induction furnace, and in stirring it subsequently at a higher level in a coreless-type of induction furnace.

7. The method of heating and stirring metal by electromagnetic induction to secure maximum efficiency, which consists in heating the metal by a core-type of electric induction furnace, in stirring it within vertical planes subsequently in a coreless-type of induction furnace, and using low frequency in the coreless type furnace.

8. The method of heating and stirring molten metal by electromagnetic induction to secure maximum efficiency, which consists in heating the metal by a core type of electric induction furnace and by it delivering the charge to a coreless type of electric induction furnace, in stirring the molten metal within vertical planes subsequently to its heating and within the coreless type of electric furnace and in using low frequency in the coreless type of electric induction furnace.

9. The method of heating and stirring molten metal in an electrical furnace having a pool, which consists in heating a part of the metal from the pool at a distance from it and in constant communication with the pool to receive metal from the pool and driving the heated metal back into the pool near the bottom of the pool by alternating electric circuit induced in the metal lengthwise of the extent of metal, in separately stirring the metal within the pool by circulating electric current about the pool and thus inducing circumferential current flow in the pool to churn metal rapidly to the surface, and in treating the highly heated and rapidly changing metal at the surface to change its character.

10. The method of heating and stirring the molten metal of an electrical furnace pool, which consists in heating metal from the pool but in constant communication with the pool so as to receive fresh molten metal from the pool, successive portions of the molten metal, affecting the heating by inducing alternating current flow in the metal and at the same time driving the heated portions of the metal back into the pool to heat the pool and circulating electric current circumferentially about the pool to induce alternating current flow in the pool to stir it.

11. The method of heating and stirring the molten metal of an electrical furnace having a pool, which consists in heating at a distance from the pool but in constant communication with it to receive metal from the pool, successive portions of the molten metal, heating by inducing alternating current flow through the lengths of the portions and thus driving the metal upwardly into the pool to heat the pool and circulating electric current of relatively low frequency about the pool to give a stirring effect relatively high as compared with the heating effect within the pool.

12. The method of heating and stirring the molten metal of an electrical furnace having a pool, which consists in heating metal from the pool but in communication with it to receive new metal from the pool, successive portions of the molten pool metal, heating by inducing low frequency alternating current flow through the lengths of the portions and thus driving the metal heated back into the pool below the level of the pool to heat the pool, concurrently circulating electric current about the pool, using current of relatively low frequency in order that the stirring effect of the current may be high as compared with the heating effect within the pool, and treating the metal at the surface to change its character.

13. The method of heating and stirring molten metal during treating chemically or by an alloying metal at its surface to change its character, which consists in heating below the pool successive portions of the metal withdrawn from the pool by induced flow of alternating current, returning them to the pool and in stirring the metal in vertical planes by induced alternating current flow circumferentially in the metal whereby the heating and mixing are completed in a minimum of time and at a minimum of expense for the current available.

14. The method of heating and stirring a molten metal pool during treatment chemically or by an alloying metal at its surface to change its character, which consists in heating successive portions of the metal from beneath the pool by continuously inducing flow of alternating electric current within it and in stirring the metal in vertical planes by induced alternating electric current flow circumferentially in the metal whereby the heating and mixing are completed in a minimum of time for the current available.

15. The method of stirring and heating molten metal, which consists in electromagnetically stirring a pool of molten metal in vertical planes upwardly near the center and downwardly near the circumference and in electromagnetically heating molten metal in communication with the pool below the level of the pool and driving the heated molten metal into the pool in a direction such that it will cross and intermingle with the downwardly moving molten metal circulated within the pool.

16. The method of heating and stirring molten metal electrically with highest efficiency, which consists in heating it electromagnetically within the lower metal levels at maximum heating efficiency with low stirring efficiency and in stirring it electromagnetically within the upper metal levels at maximum stirring efficiency and low heating efficiency and in a different part of the molten metal container within which the metal is held.

17. An electric induction furnace made up of two parts having a common pool, the lower part of core type and the upper part of coreless type and separate inductor coils for the two parts of the furnace.

18. An electric furnace comprising a furnace pool, electrical means for stirring the pool chiefly within vertical planes and electric means below the stirring action of the pool for heating the molten metal and delivering it to the pool.

19. In an electric furnace, walls forming a furnace pool and a submerged channel for a resistor communicating with the pool at opposite ends of the resistor, a primary coil within the space enclosed by the channel, a magnetic core within the coil, an inductor coil surrounding the pool, and a source of current therefor causing pinch and motor circulation in the metal of the pool.

20. An electric inductor furnace, comprising walls forming a furnace pool, a coil about the pool free from interthreading of transformer iron, walls forming a depending fluid resistor beneath the pool, transformer means for heating the fluid resistor and low frequency current supply for both the coil and the transformer.

21. In an electric furnace, walls forming a pool and a submerged molten furnace resistor connecting with the lower part of the pool, a core within the resistor, a coil about the core, an inductor coil about the pool and current supply for the two coils.

22. An electric furnace having a dependent furnace resistor in the lower part thereof, a coil therefor, a pool-surrounding coil about the upper part of the furnace, current supply for the two coils and means for subjecting the surface of the pool to chemical treatment while the metal is being circulated by current passing through the pool-surrounding coil.

23. An electric inductor furnace, comprising a furnace having two main parts at different levels, means for heating the lower part characterized by high heating and low stirring effects upon the molten metal and low frequency electric means for stirring the upper part of the furnace exerting for this reason little heating effect upon the molten metal.

GUILLIAM H. CLAMER.